US008495616B2

(12) United States Patent
Fan et al.

(10) Patent No.: US 8,495,616 B2
(45) Date of Patent: Jul. 23, 2013

(54) METHOD FOR UPGRADING COMMUNICATION EQUIPMENT

(75) Inventors: Jinfei Fan, Guangdong (CN); Jiangfa She, Guangdong (CN); Bing Luo, Guangdong (CN); Weichuan Ye, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1347 days.

(21) Appl. No.: 10/586,952

(22) PCT Filed: Feb. 4, 2005

(86) PCT No.: PCT/CN2005/000159
§ 371 (c)(1),
(2), (4) Date: Jun. 5, 2007

(87) PCT Pub. No.: WO2005/076525
PCT Pub. Date: Aug. 18, 2005

(65) Prior Publication Data
US 2007/0220503 A1 Sep. 20, 2007

(30) Foreign Application Priority Data

Feb. 4, 2004 (CN) .......................... 2004 1 0005144

(51) Int. Cl.
*G06F 9/44* (2006.01)
(52) U.S. Cl.
USPC ............................ 717/173; 717/168; 717/171
(58) Field of Classification Search
None
See application file for complete search history.

(56) References Cited

U.S. PATENT DOCUMENTS

| 6,023,620 A | 2/2000 | Hansson |
| 6,119,212 A | 9/2000 | Gross et al. |
| 6,832,373 B2 * | 12/2004 | O'Neill .......................... 717/171 |

(Continued)

FOREIGN PATENT DOCUMENTS

| CN | 1249112 A | 3/2000 |
| CN | 1358050 A | 7/2002 |
| EP | 1 267 261 A2 | 12/2002 |
| EP | 1 271 311 A2 | 1/2003 |

OTHER PUBLICATIONS

Probst et al. Flexible Configuration and Concurrent Upgrade for the IBM eServer z900. IBM Journal of Research and Development, Jul. 2002, pp. 551-558, Retrieved on [Mar. 14, 2013] Retrieved from the Internet: URL<http://ieeexplore.ieee.org/stamp/stamp.jsp?tp=&arnumber=5389018>.*

(Continued)

*Primary Examiner* — Thuy Dao
*Assistant Examiner* — Cheneca Smith
(74) *Attorney, Agent, or Firm* — Conley Rose, P.C.; Grant Rodolph; Nicholas K. Beaulieu

(57) ABSTRACT

Disclosed is a method for updating communication equipment through a server in a communication system, where the server stores the updated files used for updating the communication equipment. In this method, configuration data in the communication equipment are backed up in the server at first, and then the updated files are downloaded to the communication equipment from the server, and the updated files are loaded to the communication equipment to implement the communication equipment update; at last, the configuration data backed up in the server are recovered to the communication equipment. The disclosed method can guarantee the successful update of the communication equipment and no data loss after the update, thus the security of the communication equipment update is greatly improved.

24 Claims, 1 Drawing Sheet

U.S. PATENT DOCUMENTS

| | | | |
|---|---|---|---|
| 6,836,657 B2 * | 12/2004 | Ji et al. ........................ | 455/419 |
| 7,221,912 B2 * | 5/2007 | Nelson et al. ............... | 455/67.11 |
| 7,386,846 B2 * | 6/2008 | Rajaram ...................... | 717/173 |
| 7,472,386 B2 * | 12/2008 | Lo ................................ | 717/173 |
| 2002/0023258 A1 * | 2/2002 | Elwahab et al. ............. | 717/122 |
| 2002/0072350 A1 | 6/2002 | Fukuzato | |
| 2002/0104080 A1 * | 8/2002 | Woodard et al. ............. | 717/176 |
| 2003/0037323 A1 | 2/2003 | Bae .............................. | 717/170 |
| 2003/0041133 A1 * | 2/2003 | Hiroshige et al. ............ | 709/222 |
| 2003/0204578 A1 * | 10/2003 | Yip et al. ..................... | 709/222 |
| 2003/0204711 A1 * | 10/2003 | Guess ............................ | 713/1 |
| 2003/0225985 A1 | 12/2003 | Suzuki et al. ................ | 711/157 |
| 2003/0225986 A1 | 12/2003 | Teshima | |
| 2004/0015940 A1 * | 1/2004 | Heisey et al. ................ | 717/168 |
| 2004/0068721 A1 * | 4/2004 | O'Neill et al. ............... | 717/168 |
| 2004/0093597 A1 * | 5/2004 | Rao et al. ..................... | 717/171 |
| 2004/0261072 A1 * | 12/2004 | Herle ............................ | 717/171 |
| 2005/0132351 A1 * | 6/2005 | Randall et al. ............... | 717/168 |
| 2005/0144616 A1 * | 6/2005 | Hammond et al. ........... | 717/173 |
| 2005/0289533 A1 * | 12/2005 | Wang et al. .................. | 717/168 |

OTHER PUBLICATIONS

Srivastava, Sameer. Redundancy Management for Network Devices. The 9th Asia-Pacific Conference on Communications, Sep. 2003, pp. 1157-1162, Retrieved on [Mar. 14, 2013] Retrieved from the Internet: URL<http://ieeexplore.ieee.org/stamp/stamp.jsp?tp=&arnumber=1274282>.*

Notice of Opposition to European Patent Application No. 05706597.1, dated May 20, 2009.

International Search Report for Application No. PCT/CN2005/000159, dated May 19, 2005.

Response to European Opposition for Application No. EP 1713198, dated Dec. 3, 2009.

Written Opinion for Application No. PCT/CN2005/000159, dated Apr. 13, 2005.

"An Automatically Upgrading Method Orienting to C/S Application System," Journal of Zhengzhou Institute of Light Industry, vol. 16, No. 3, Sep. 2001, pp. 15-19.

"Method for Backuping User Configurations of Huawei Routers," Financial Computer of Huanan, No. 7, Jul. 10, 2003, p. 84.

Official action issued on Apr. 6, 2007, by Chinese Patent Office in corresponding application CN 200410005144.2.

European Search Report for International Application No. PCT/CN2005/000159, dated Mar. 8, 2007.

European Office Action for Application No. 05 706 597.1-1244, dated Sep. 10, 2007.

* cited by examiner

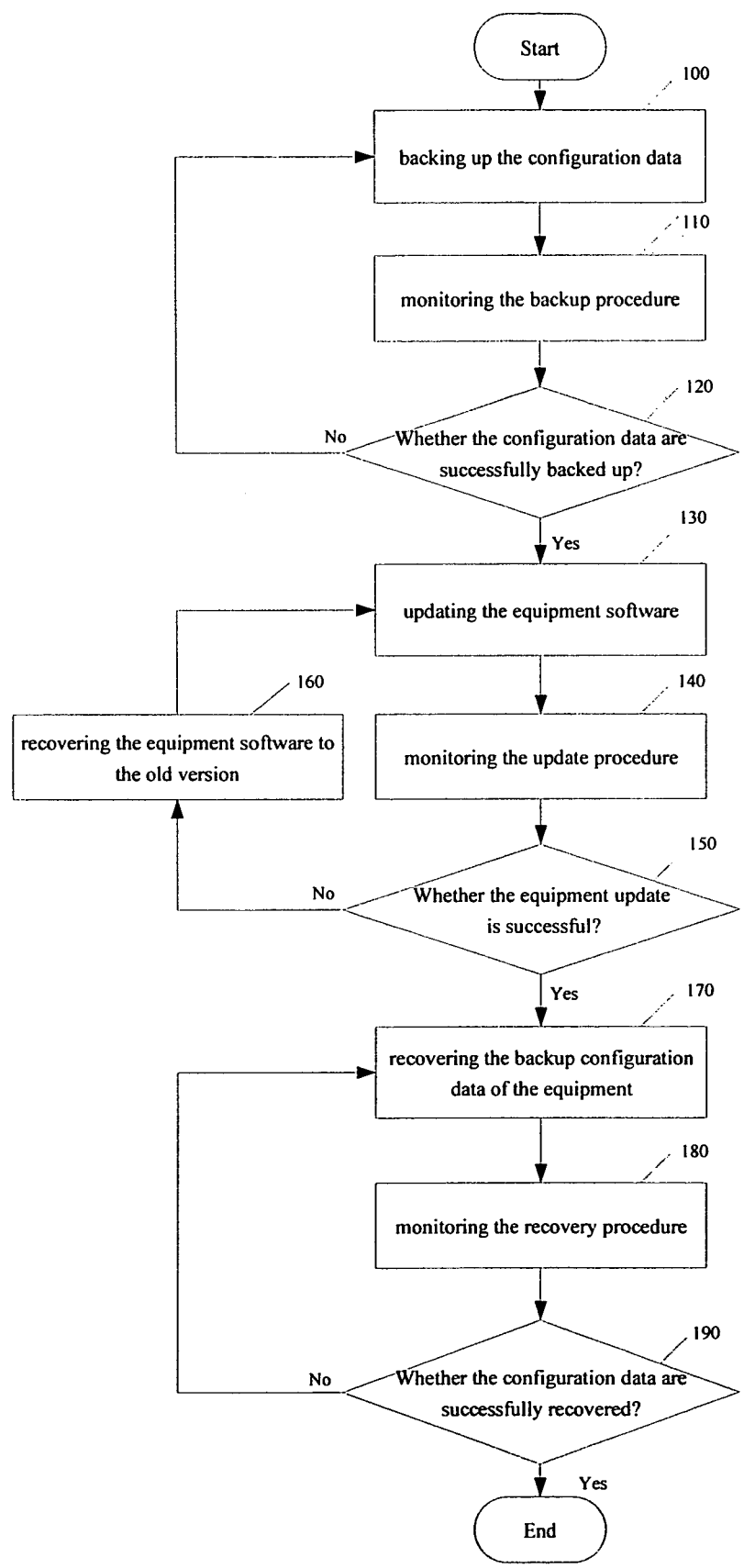

METHOD FOR UPGRADING COMMUNICATION EQUIPMENT

CROSS REFERENCES TO RELATED APPLICATIONS

This application is the national phase of International Application No. PCT/CN2005/000159, which was filed on Feb. 4, 2005, and which, in turn, claimed the benefit of Chinese Patent Application No. 200410005144.2, which was filed Feb. 4, 2004, the entire disclosures of which are hereby incorporated by reference.

FIELD OF THE TECHNOLOGY

The present invention relates to communication field, more particularly to a method for updating communication equipment.

BACKGROUND OF THE INVENTION

In the communication field, as new technologies and new services continuously emerge, the software of the communication equipment needs to be updated frequently, so as to maintain and optimize the communication network and provide more extensive and better communication services. Software update involves almost all communication equipment, such as switches, routers, Integrated Access Devices (IADs) and so on.

In all the existing software update procedures, the software to be updated is stored in an independent server, and then a data transmission connection is established between this server and the communication equipment to be updated, so that the software stored in the server can be transmitted to the communication equipment. During the update procedure, the corresponding files of the software stored in the server are directly transmitted to the communication equipment, and then the communication equipment loads the software to replace the old files with the new files, and the equipment is updated accordingly.

However, in the existing methods for updating equipment, the communication equipment does not back up the old configuration data which includes the user data, therefore during the software update procedure, if the communication equipment is powered off or the updated files error happens and so on, the old configuration data may be lost, which can bring great loss to the operators. In other words, the risk of losing data during the equipment update procedure exists in the prior art, which affects the security of the equipment update.

In addition, in the existing methods for updating equipment, the software update procedure is not monitored. If an error occurs during the update procedure, e.g., the communication equipment is powered off or the updated files error happens, the old service ability of equipment may not be inherited after the update procedure is finished, which may lead to unsuccessful equipment update and harm the security of the equipment update.

Moreover, in the existing communication equipment, the old software version is usually not saved during the update procedure, so the old software version is not available to the equipment anymore in the case of unsuccessful update. Therefore, after the unsuccessful update, the communication equipment may change into failure or fault and cannot function normally, which greatly affects the security of the equipment update.

SUMMARY OF THE INVENTION

In view of the above, the present invention is to provide a method for updating equipment that can implement a secure update, so as to avoid data loss from happening during the update procedure and make sure that the update is successful.

The present invention discloses a method for updating communication equipment in a communication system through a server, which stores updated files used for updating the communication equipment. The method at least includes:
  backing up configuration data in the communication equipment to the server;
  downloading the updated files to the communication equipment from the server, and loading the updated files to the communication equipment to implement the communication equipment update;
  recovering the configuration data backed up in the server to the communication equipment.

Preferably, the step of backing up the configuration data in the communication equipment to the server further includes: the server monitoring the backup procedure of the configuration data and judging whether the configuration data are successfully backed up, if yes, executing the step of downloading the updated files to the communication equipment from the server and loading the updated files to the communication equipment to implement the communication update; otherwise, instructing the communication equipment to execute the backup operation for the configuration data again.

Hereby, the step of the server judging whether the configuration data are successfully backed up includes: judging whether a backup failure message is received from the communication equipment or judging whether the backup operation exceeds a scheduled time. Moreover, before instructing the communication equipment to execute the backup operation for the configuration data again, the method further includes: notifying a user that the current configuration data backup has failed and asking the user whether to back up the data over again; after receiving the user's instruction to back up the data over again, executing the step of instructing the communication equipment to execute the backup operation again; otherwise, ending the current process.

When the communication equipment is an Integrated Access Device (IAD), and the server is a File Transfer Protocol/Trivial File Transfer Protocol (FTP/TFTP) server, the step of backing up the configuration data in the communication equipment to the server further includes:
  an IAD Management System (IADMS) sending a Simple Network Management Protocol (SNMP) backup configuration data command to the IAD;
  and the step of backing up the configuration data in the communication equipment to the server includes:
  after receiving the SNMP backup configuration data command, the IAD transmitting the configuration data files to the specified FTP/TFTP server via the FTP/TFTP protocol.

The configuration data include one or more than one type among user data, port data, protocol parameter data and default parameter data for guaranteeing the normal operation of the equipment.

Preferably, the step of downloading the updated files to the communication equipment from the server and loading the updated files to the communication equipment to implement the communication update further includes: the server monitoring the update procedure of the communication equipment and judging whether the update is successful, if yes, executing the step of recovering the configuration data backed up in the server to the communication equipment; otherwise, instructing the communication equipment to execute the update operation over again.

Hereby, the server judging whether the update is successful includes: judging whether an update failure message is received from the communication equipment or judging whether the update operation exceeds the scheduled time. Moreover, before instructing the communication equipment to execute the update operation again, the method further includes: notifying the user that the current update has failed and asking the user whether to update the equipment over again or not; after receiving the user's instruction to update the equipment over again, executing the step of instructing the communication equipment to execute the update operation again; otherwise, ending the current process.

The method may further include a step of storing an old software version in the communication equipment before executing the update operation, and a step of instructing the communication equipment to recover the current software to the old version before instructing the communication equipment to execute the update operation over again.

When the communication equipment is the IAD, and the server is the FTP/TFTP server, the step of downloading the updated files to the communication equipment from the server and loading the updated files to the communication equipment to implement the communication update further includes:

the IADMS sending an SNMP update command which includes the address information of the FTP/TFTP server and the name information of the updated files;

and the step of downloading the updated files to the communication equipment from the server and loading the updated files to the communication equipment includes:

after receiving the SNMP update command, the IAD downloading the updated files corresponding to the updated files name from the specified FTP/TFTP server via the FTP/TFTP protocol, and then loading the updated files.

Preferably, the step of recovering the configuration data backed up in the server to the communication equipment further includes: the server monitoring the recovery procedure of the configuration data, and judging whether the configuration data are successfully recovered, if yes, ending the current process; otherwise, instructing the communication equipment to execute the recovery operation for the configuration data over again.

Hereby, the server judging whether the configuration data are successfully recovered includes: judging whether a recovery failure message is received from the communication equipment or judging whether the recovery operation exceeds the scheduled time. Moreover, before instructing the communication equipment to execute the recovery operation for the configuration data over again, the method further includes: notifying the user that the current configuration data recovery has failed and asking the user whether to recover the configuration data over again; after receiving the user's instruction to recover the configuration data over again, executing the step of instructing the communication equipment to execute the recovery operation over again; otherwise, ending the current process.

When the communication equipment is the IAD, and the server is the FTP/TFTP server, the step of recovering the configuration data backed up in the server to the communication equipment further includes:

the IADMS sending an SNMP recovery configuration data command which includes the address information of the FTP/TFTP server and the name information of the configuration data files;

and the step of recovering the configuration data backed up in the server to the communication equipment includes: after receiving the SNMP recovery configuration data command, the IAD downloading the configuration data files corresponding to the configuration data files name from the specified FTP/TFTP server via the FTP/TFTP protocol, and then loading the configuration data files.

The step of recovering the configuration data backed up in the server to the communication equipment further includes a step of modifying the format of the configuration data.

It can be seen from the above-mentioned technical schemes that, besides the equipment update by directly downloading the updated files and loading the updated files according to the prior art, the present invention further includes the process of backing up the configuration data before the update and recovering the configuration data after the update, so that data loss will not happen when the communication equipment power off happens or the update is unsuccessful and the old software version needs be maintained. So the present invention can avoid great loss for the operators due to the data loss and the security of the equipment update is improved accordingly.

During the procedures of backing up the configuration data, updating the software and recovering the configuration data, the communication equipment operation is monitored all the time to judge whether the operation is successful. If the operation is unsuccessful, the corresponding operation will be executed again automatically, so that the configuration data can be backed up, the software can be updated and the configuration data can be recovered again even if the communication equipment is powered off or the update is unsuccessful. Therefore, the present invention can guarantee the update is successful anyway and thus improve the security of the equipment update.

Moreover, in the present invention, the old software version can be stored before the update, so that the old software version is available once the update is unsuccessful. In the prior art, once the update is unsuccessful, new software cannot be run and the old software is not available, so the communication equipment changes into failure or fault, while the present invention can prevent such situation from happening and thus further improve the security of the equipment update.

BRIEF DESCRIPTION OF THE DRAWINGS

FIG. 1 is a flowchart illustrating the equipment update method according to one embodiment of the present invention.

DETAILED DESCRIPTION OF THE INVENTION

The present invention will be further described in detail hereinafter with reference to the accompanying drawings and specific embodiments.

The communication equipment can be the equipment utilized in any fixed or mobile communication networks, such as exchangers, routers, Integrated Access Devices (IADs) and so on. Hereby the IAD can be the video telephone, the Media Gateway Control Protocol (MGCP) IAD, the Internet Protocol (IP) telephone terminal or others. The following embodiment will be illustrated taking the IAD for example, but those skilled in the art should understand that all the above illustrations can be applied in the other communication equipment without any obstacles.

In the prior art, the data can be easily lost and the software update is not guaranteed to be successful. In order to solve such problems, processes of backing up the configuration data, recovering the configuration data and monitoring the whole software update procedure are added to the present invention. FIG. 1 is a flowchart illustrating the whole equipment update method after adding the above-mentioned processes.

As shown in FIG. 1, in step 100, the configuration data are backed up at first. Specifically, firstly the FTP/TFTP server information is configured to the IAD through the IADMS, and then the IADMS sends an SNMP backup configuration data command to IAD. After receiving this command, the IAD transmits the configuration data to the specified FTP/TFTP server via the FTP/TFTP protocol.

The configuration data hereby can be one or more than one type among user data, port data, protocol parameter data and default parameter data for guaranteeing the normal operation of the equipment. Of course, those skilled in the art should understand that the configuration data can also be other types of data besides the above mentioned ones.

In step 110, the procedure of backing up the configuration data is monitored. While backing up the configuration data, the IAD will report the current backup progress to the IADMS through the progress TRAP, so that the IADMS can acquire the backup status of the IAD through the progress TRAP received from the IAD, thus the monitor function is implemented.

In step 120, the IADMS judges whether the configuration data are successfully backed up, if yes, executing the next step 130; otherwise, returning to the step 100, which is to instruct the IAD to back up the configuration data over again, and the IAD will back up the configuration data over again after receiving this instruction.

The process of judging whether the configuration data are successfully backed up is to judge whether a backup failure TRAP is received or whether the backup procedure exceeds the scheduled time. If the IADMS receives the backup failure TRAP from the IAD or detects that the operating time of the backup procedure of the IAD exceeds the scheduled time, the IADMS confirms the backup has failed; otherwise, the backup is successful.

Moreover, after confirming the backup has failed, IADMS can notify a user that the current backup fails and that the user can choose whether to back up the data over again. After receiving the user's indication of backing up the data over again, the IADMS will instruct the IAD to back up the configuration data over again. If the user chooses not to back up the data anymore, the current process will be ended.

In step 130, the equipment software is updated. Firstly, the IADMS sends an SNMP update command to the IAD, and this command comprises updated FTP/TFTP server address, updated files name and other information. After receiving this command, the IAD analyzes it and downloads the updated files from the FTP/TFTP server via the FTP/TFTP protocol, according to the FTP/TFTP server address, the updated files name and other information comprised in this command. After downloading all the updated files, the IAD loads the updated files to implement the equipment software update.

In addition, as to some communication equipment, the loaded software is not effective until resetting the equipment. In this case, the IADMS needs to send an SNMP reset command to the IAD and request the IAD to reset. The IAD resets itself after receiving this SNMP reset command, so that the current loaded new software version can be effective. Of course, as to those communication equipment that can make the loaded software effective without resetting themselves, the above-illustrated reset process can be removed.

In step 140, the update procedure of the equipment software is monitored. While downloading and loading the updated files, the IAD will report the current update progress to the IADMS through the progress TRAP, so that IADMS can acquire the update status of the IAD through the progress TRAP received from the IAD, thus the monitor function is implemented.

In step 150, IADMS judges whether the equipment update is successful. If it is unsuccessful, it go to step 160, i.e., the IADMS will instruct the IAD to recover the old software version before the software update, and the IAD will automatically replace the current software with the old one after receiving this indication. If the IADMS judges that update is successful, it will execute the next step 170.

In the present embodiment, after the step 160, which means after the IAD has replaced the current software version with the old one, the step 130 will be automatically executed, which means the IADMS will instruct the equipment to execute the update process over again. As the update may be unsuccessful finally due to power off in the previous update procedure, executing the update process over again can guarantee the update function after the power is recovered; while if the update is unsuccessful because of the updated files error, the IADMS can re-specify the correct updated files name in the SNMP update command sent to the IAD so as to make sure that the update is successful this time.

Of course, the IADMS can also notify the user of this situation after the IAD has recovered the old software version. The IADMS can also ask the user whether to update the equipment over again. After receiving the user's indication of updating equipment over again, the IADMS will instruct the IAD to execute the update operation over again. If the user chooses not to update anymore, the current process will be ended.

In the present invention, two memory buffers can be set inside the equipment to be updated, one for storing the software version before the update and the other for storing the new software version. In this way, if the current update is unsuccessful, the equipment can read the old software version from the memory buffer that stores the software version before update so as to recover the old software. Since the two software versions are stored in two memory buffers respectively, the unsuccessful update will not affect the software version before update, so that communication equipment can recover the complete old software and will not change into failure or fault because of the abnormal operation.

The procedure of judging whether the update is successful is to judge whether an update failure TRAP is received or whether the update operation exceeds the scheduled time. If the IADMS receives the update failure TRAP from the IAD or determines that the update operation of IAD exceeds the scheduled time, the update is deemed as unsuccessful, otherwise, the update is successful.

In step 170, the backup configuration data are recovered. The IADMS sends the recovery configuration data command to the IAD, and the command comprises the address information of the FTP/TFTP server which stores the configuration data, the configuration data files name and so on. After receiving this command, the IAD analyzes this command and downloads the configuration data from the corresponding FTP/TFTP server via the FTP/TFTP protocol according to the FTP/TFTP server address, the configuration data name and other information comprised in this command. After downloading all the configuration data files, the IAD loads the updated files.

In step 180, the recovery procedure of the configuration data is monitored. While downloading the configuration data and loading the configuration data, the IAD will report the current progress to the IADMS through the progress TRAP, so that the IADMS can acquire the recovery status of the IAD through the progress TRAP received from the IAD, thus the monitor function is implemented.

In step 190, the IADMS judges whether the configuration data are successfully recovered, if yes, the equipment update procedure is successfully completed and the current process is ended. If the configuration data are not successfully recovered, the step 170 is executed, namely the IADMS instructs the IAD to recover the configuration data over again. After receiving this instruction, the IAD downloads and loads the configuration data over again.

The process of judging whether the configuration data are successfully recovered is to judge whether a recovery failure TRAP is received or whether the recovery procedure exceeds the scheduled time. If the IADMS receives the recovery failure TRAP from the IAD or determines that the recovery operation of the IAD exceeds the scheduled time, the IADMS confirms that the recovery operation fails; otherwise, the recovery operation is successful.

Moreover, after confirming that the recovery operation fails, the IADMS can notify the user that current recovery operation fails and asks the user whether to recover the data over again. After receiving the user's instruction of recovering the data over again, the IADMS instructs the IAD to recover the configuration data over again. If the user chooses not to recover the data anymore, the current process will be ended.

In some cases, like when the new software and old software are different from each other, it is needed to modify the configuration data properly, so that the configuration data can be successfully applied in the new software environment after being recovered, i.e. the configuration data can be successfully recovered. Hereby after the IAD resets in the abovementioned step 170, the IADMS further judges whether it is needed to modify the configuration data, if yes, the IADMS notifies the user to modify the data or instructs the IAD to automatically modify the data by running an application program which is specially used for modifying the configuration data, and continues to execute the recovery operation for the configuration data in the step 170 after finishing the modification. Hereby, the configuration data modification, like conversing configuration data's format, can make the new configuration data format accord with the requirement of the new software, so as to make sure the configuration data can be successfully applied in the new software environment.

In case of needing to modify the configuration data, the configuration data recovery may be unsuccessful finally because of the incorrect configuration data modification, when the IADMS finds the configuration data recovery unsuccessful, it will return to the process of instructing the user to modify the configuration data or instructing the IAD to run the application program to modify the configuration data. After the configuration data are correctly modified, the configuration data are recovered again so as to make sure the configuration data can be successfully recovered.

The above mentioned is just the preferred embodiment of the present invention and not used to confine the present invention. Any modification, equivalent substitute and improvement within the spirit of the present invention are with the protection scope of the present invention.

What is claimed is:

1. A method for updating an Integrated Access Device (IAD) in a communication system, the method comprising:
configuring, on the IAD, server information from an IAD Management System (IADMS) that is externally connected to the IAD;
receiving, by the IAD, a Simple Network Management Protocol (SNMP) backup configuration data command from the IADMS;
backing up, by the IAD, configuration data of the IAD to a specified server that is externally connected to the IAD and that corresponds to the server information according to the SNMP backup configuration data command from the IADMS;
receiving, by the IAD, an SNMP update command from the IADMS, wherein the SNMP update command comprises updated server address information and updated files name information;
downloading, by the IAD, updated files from a server according to the updated server address information in the SNMP update command;
loading the updated files to the IAD;
receiving, by the IAD, an SNMP recovery configuration data command from the IADMS, wherein the SNMP recovery configuration data command comprises server address information and configuration data files name information; and
recovering the configuration data backed up on the specified server to the IAD according to the server address information and the configuration data files name information in the SNMP recovery configuration data command from the IADMS.

2. The method of claim 1, wherein each one of the specified server and the server is either a File Transfer Protocol (FTP) server or a Trivial File Transfer Protocol (TFTP) server.

3. The method according to claim 1, wherein backing up the configuration data of the IAD to the specified server comprises:
transmitting the configuration data of the IAD to the specified server; and
determining whether the configuration data is successfully backed up to the specified server,
wherein if the configuration data is not successfully backed up to the specified server, then the method further comprises determining whether to re-transmit the configuration data to the specified server.

4. The method according to claim 3, wherein determining whether the configuration data is successfully backed up to the specified server comprises:
determining whether a backup failure message is received from the IAD; and
determining whether a transmission time of the configuration data exceeds a predetermined time,
wherein if either the backup failure message is received or the transmission time exceeds the predetermined time, then the configuration data is determined to have not been successfully backed up to the specified server.

5. The method according to claim 3, wherein when the configuration data is not successfully backed up to the specified server, determining whether to re-transmit the configuration data to the specified server comprises:
notifying a user of the IAD that the configuration data was not successfully backed up to the specified server; and
prompting the user to provide instructions as to whether backing up of the configuration data to the specified server should be re-attempted,
wherein if the user provides an instruction to re-attempt backing up of the configuration data to the specified server, then the method further comprises repeating transmission of the configuration data to the specified server.

6. The method according to claim 5, wherein if the user does not provide an instruction to re-attempt backing up of the configuration data to the specified server, then the transmission of the configuration data to the specified server is not repeated.

7. The method according to claim 6, wherein before downloading the updated files from the server and loading the updated files to the IAD, the method further comprises:
storing current files in the IAD, wherein the current files are replaced by the updated files when the updated files are loaded to the IAD, and
wherein if the updated files are not successfully loaded to the IAD, then the current files in the IAD are recovered before repeating the steps of downloading the updated files from the server and loading the updated files to the IAD.

8. The method according to claim 1, further comprising:
determining whether the updated files are successfully loaded to the IAD,
wherein if the updated files are not successfully loaded to the IAD, then the method further comprises determining whether to repeat the steps of downloading the updated files from the server and loading the updated files to the IAD.

9. The method according to claim 8, wherein determining whether the updated files are successfully loaded to the IAD comprises:
determining whether an update failure message is received from the IAD; and
determining whether a loading time of the updated files exceeds a predetermined time, wherein the loading time corresponds to the time required to receive the updated files from the server and load the updated files to the IAD;
wherein, if either the update failure message is received or the loading time exceeds the predetermined time, then the updated files are determined to have not been successfully loaded to the IAD.

10. The method according to claim 8, wherein determining whether to repeat the steps of downloading the updated files from the server and loading the updated files to the IAD comprises:
notifying a user of the IAD that the updated files were not successfully loaded to the IAD; and
prompting the user to provide instructions as to whether loading the updated files to the IAD should be re-attempted,
wherein if the user provides an instruction to re-attempt loading the updated files to the IAD, then the method further comprises repeating the steps of downloading the updated files from the server and loading the updated files to the IAD.

11. The method according to claim 1, wherein recovering the configuration data backed up to the server comprises:
downloading the configuration data from the server to the IAD;
loading the configuration data to the IAD; and
determining whether the configuration data was successfully recovered by the IAD,
wherein if the configuration data is not successfully recovered by the IAD, then the method further comprises determining whether recovery of the configuration data should be re-attempted by the IAD.

12. The method according to claim 11, wherein determining whether recovery of the configuration data should be re-attempted by the IAD comprises;
notifying a user of the IAD that the configuration data was not successfully recovered by the IAD; and
prompting the user to provide instructions as to whether recovery of the configuration data should be re-attempted by the IAD,
wherein if the user provides an instruction that recovery of the configuration data should be re-attempted by the IAD, then the method further comprises re-attempting recovery of the configuration data by the IAD.

13. The method according to claim 1, wherein recovering the configuration data backed up to the server comprises:
downloading, by the IAD, the configuration data files according to the SNMP recovery configuration data command, Wherein the server address information allows the IAD to locate the server, and wherein the configuration data files name information allows the IAD to identify the configuration data files; and
loading the configuration data files to the IAD.

14. An Integrated Access Device (IAD) having a processor comprising:
an interface unit externally connected to one or more servers and configured to establish a communication connection with the one or more servers; and
an update control unit configured to:
configure server information from an IAD Management System (IADMS) on the IAD;
receive a Simple Network Management Protocol (SNMP) backup configuration data command from the IADMS;
back up configuration data of the IAD to a specified server corresponding to the server information via the interface unit according to the SNMP backup configuration data command from the IADMS;
receive an SNMP update command from the IADMS, wherein the SNMP update command from the IADMS comprises updated server address information and updated files name information;
download updated files from a server according to the updated server address information in the SNMP update command from the IADMS;
load the updated files to the IAD;
receive an SNMP recovery configuration data command from the IADMS, wherein the SNMP recovery configuration data command comprises server address information and configuration data files name information; and
recover configuration data backed up on the specified server to the IAD according to the server address information and the configuration data files name information in the SNMP recovery configuration data command from the IADMS.

15. The IAD of claim 14, wherein each one of the specified server and the server is either a File Transfer Protocol (FTP) server or a Trivial File Transfer Protocol (TFTP) server.

16. A method for updating communication equipment in a communication system, the method comprising:
receiving, at the communication equipment, a backup configuration data command from a management system externally connected to the communication equipment;
in response to the backup configuration data command, transmitting configuration data of the communication equipment from the communication equipment to a specified server externally connected to the communication equipment such that the configuration data can be backed up on the specified sever;
receiving, at the communication equipment, an update command comprising server address information and file name information from the management system;

downloading, at the communication equipment, updated files of software from a server according to the server address information and the file name information in the update command;

loading the updated files to the communication equipment;

receiving, at the communication equipment, a recovery configuration data command comprising server information of the specified server from the management system; and recovering downloaded configuration data to the communication equipment to apply to new software, wherein the downloaded configuration data is downloaded from the specified server using the server information of the specified server.

17. The method according to claim 16, wherein the specified server is a Trivial File Transfer Protocol (TFTP) server.

18. The method according to claim 16, wherein the communication equipment is at least one of a switch, a router, and an Integrated Access Device (IAD).

19. The method according to claim 16, wherein the downloaded configuration data has a new configuration data format in accord with the requirement of the new software.

20. The method of claim 16, further comprising converting the download configuration data's format to make a new configuration data format in accord with the requirement of the new software.

21. A communication equipment having a process, which is one of a switch, a router, and an Integrated Access Device (IAD), and is capable of implementing a software update through one or more servers externally connected thereto, the communication equipment configured to:

receive a backup configuration data command from a management system externally connected to the communication equipment;

in response to the backup configuration data command, transmit configuration data of the communication equipment to a specified server externally connected to the communication equipment such that the configuration data can be backed up on the specified sever;

receive an update command comprising server address information and file name information from the management system;

download updated files of software from a server according to the server address information and the file name information in the update command;

load the updated files to the communication equipment;

receive a recovery configuration data command comprising server information of the specified server from the management system; and recover downloaded configuration data to the communication equipment to apply to new software, wherein the downloaded configuration data are downloaded from the specified server using the server information of the specified server.

22. The communication equipment according to claim 21, wherein the specified server is a Trivial File Transfer Protocol (TFTP) server.

23. The communication equipment according to claim 21, wherein the downloaded configuration data has a new configuration data format in accord with the requirement of the new software.

24. The communication equipment according to claim 21, further configured to convert the download configuration data's format to make a new configuration data format in accord with the requirement of the new software.

* * * * *

UNITED STATES PATENT AND TRADEMARK OFFICE
CERTIFICATE OF CORRECTION

PATENT NO. : 8,495,616 B2  
APPLICATION NO. : 10/586952  
DATED : July 23, 2013  
INVENTOR(S) : Jinfei Fan, Jiangfa She and Weichuan Ye Page 1 of 1

It is certified that error appears in the above-identified patent and that said Letters Patent is hereby corrected as shown below:

Title Page 2: References Cited (56) - Other Publications entry should read as follows: "Notice of Opposition to European Patent Application No. 05706597.1, dated May 20, 2009."

In the Claims

Claim 9, Column 9/Line 34 should read: "wherein if either the update failure message is received or"

Claim 13, Column 10/Line 12 should read: "command, wherein the server address information"

Claim 21, Column 11/Line 27 should read: "21. A communication equipment having a processor, which"

Signed and Sealed this  
Twenty-fourth Day of September, 2013

Teresa Stanek Rea  
*Deputy Director of the United States Patent and Trademark Office*